United States Patent
Kloppenburg et al.

(10) Patent No.: US 9,963,519 B2
(45) Date of Patent: May 8, 2018

(54) NDBR WITH MOLAR MASS BREAKDOWN

(71) Applicant: ARLANXEO Deutschland GmbH, Dormagen (DE)

(72) Inventors: Heike Kloppenburg, Duesseldorf (DE); Alicia Le-Sattler, Bochum (DE)

(73) Assignee: ARLANXEO Deutschland GmbH, Dormagen (DE)

( * ) Notice: Subject to any disclaimer, the term of this patent is extended or adjusted under 35 U.S.C. 154(b) by 0 days. days.

(21) Appl. No.: 15/457,074

(22) Filed: Mar. 13, 2017

(65) Prior Publication Data

US 2017/0183424 A1    Jun. 29, 2017

Related U.S. Application Data

(63) Continuation of application No. 15/029,029, filed as application No. PCT/EP2014/071684 on Oct. 9, 2014, now abandoned.

(30) Foreign Application Priority Data

Oct. 16, 2013 (EP) .................................. 13188993

(51) Int. Cl.

| | | |
|---|---|---|
| *C08F 4/00* | (2006.01) |
| *C08F 4/44* | (2006.01) |
| *C08F 36/00* | (2006.01) |
| *C08C 19/20* | (2006.01) |
| *C08C 19/08* | (2006.01) |
| *C08L 15/00* | (2006.01) |
| *C08F 136/06* | (2006.01) |
| *C08K 5/3417* | (2006.01) |
| *C08K 5/372* | (2006.01) |

(52) U.S. Cl.
CPC .............. *C08C 19/20* (2013.01); *C08C 19/08* (2013.01); *C08F 136/06* (2013.01); *C08K 5/3417* (2013.01); *C08K 5/3725* (2013.01); *C08L 15/00* (2013.01)

(58) Field of Classification Search
CPC .......... C08C 19/08; C08C 19/20; C08L 15/00
USPC .................................. 526/90, 191, 237, 335
See application file for complete search history.

(56) References Cited

U.S. PATENT DOCUMENTS

| | | | | |
|---|---|---|---|---|
| 5,567,784 A | * | 10/1996 | Wieder | .................... C08C 19/20 526/153 |
| 7,135,514 B2 | * | 11/2006 | Johansson | ................ C08K 5/09 523/351 |
| 9,822,195 B2 | | 11/2017 | Ruchmer et al. | |
| 9,845,366 B2 | | 12/2017 | Kloppenburg et al. | |
| 2012/0100934 A1 | | 4/2012 | Sullivan et al. | |

* cited by examiner

*Primary Examiner* — William K Cheung

(57) ABSTRACT

The invention relates to neodymium-catalyzed polybutadienes (NdBR) comprising >95 wt % of cis-1,4 units and <1 wt % of 1,2-vinyl content, based on the neodymium-catalyzed polybutadiene, wherein the NdBR evinces a molar mass breakdown of not less than 25%.

18 Claims, No Drawings

NDBR WITH MOLAR MASS BREAKDOWN

This application is a continuation of U.S. patent application Ser. No. 15/029,029, filed Apr. 13, 2016, with the same title, now abandoned, which claims the right of priority under 35 U.S.C. § 119 (a)-(d) and 35 U.S.C. § 365 of International Application No. PCT/EP2014/071684, filed Oct. 9, 2014, which is entitled to the right of priority of European Patent Application No. 13188993.3, filed Oct. 16, 2013, the contents of which are hereby incorporated by reference in their entirety.

The invention relates to neodymium-catalysed polybutadienes (NdBR) comprising >95 wt % of cis-1,4 units and <1 wt % of 1,2-vinyl content, based on the neodymium-catalysed polybutadiene, a process for production thereof, a rubber mixture comprising such NdBR and uses thereof.

Polybutadienes are used as important constituents of rubber mixtures in the tyre industry in order to achieve an improvement in final properties, for instance a reduction in rolling resistance and in abrasion value. A further field of use is in golf-ball cores or shoe soles, the primary concern in this case being a high rebound resilience.

For quite some time, polybutadienes having a high fraction of cis-1,4 units have been manufactured on a large industrial scale and used for the production of tyres and other rubber products and also for impact modification of polystyrene.

The high fractions of cis-1,4 units are currently achieved by using almost exclusively catalysts based on compounds of the rare earth metals, as described in EP-A 1 0 011 184 and EP-B-A1 0 007 027 for example.

It is known from the prior art that neodymium-catalysed polybutadienes within the group of high-cis polybutadienes have particularly advantageous properties with regard to rolling resistance, abrasion value and rebound resilience. The catalyst systems used play an important part in the production of polybutadienes.

The Industrially employed neodymium catalyst, for example, is a Ziegler-Natta system, which is formed from a plurality of catalyst components. Catalyst formation involves the formation of mostly different catalytic sites, resulting in an at least bimodal molar mass distribution in the polymer. In the Ziegler-Natta catalyst system, the familiar three catalyst components, usually being a neodymium source, a chloride source and an organoaluminium compound, are mixed in various ways under defined temperature conditions to ready the catalyst system, with or without ageing, for the polymerization.

The prior art discloses several processes for preparing Ziegler-Natta catalyst systems used in the production of polybutadienes.

The prior art likewise discloses EP 0 127 236, wherein the catalyst is prepared by mixing neodymium oxides, neodymium alkoxides and carboxylates with an organometallic halide and also with an organic compound at a temperature of 20° C. to 25° C. The mixing temperature for these four components may also be in the range from 50° C. to 80° C. In this version, the mixture is cooled down to a temperature in the range from 20 to 25° C., at which point diisobutyl-aluminum hydride (DIBAH) is added. There is no mention of any ageing.

EP 1 176 157 B1 discloses a process for production of polybutadienes having a reduced ratio for solution viscosity/Mooney viscosity, wherein catalyst preparation is carried out with pre-forming. First the neodymium versatate is mixed with DIBAH and Isoprene at 50° C., then this mixture is cooled down to 5° C., thereafter ethylaluminium sesquichloride (EASC) is admixed. Ageing can take from several minutes to several days at a temperature between 10° C. and −80° C. Comonomers, a bisdiene for example, are added during polymerization to enhance the branching of the polymers and thus also to obtain the very narrow ratio of solution viscosity/Mooney viscosity. The branched polymer obtained in the process has at least four free chain ends per molecule due to the coupling via the bisdiene, whereas linear molecules have just two chain ends.

The number of chain ends in a polymer has a direct correlation with energy dissipation performance. The energy dissipation performance of a polymer increases with the number of free chain ends. The lower the energy dissipation performance of a polymer, however, the lower, for example, the rolling resistance and the better the rebound resilience of the polymer.

For the same molar mass, therefore, the final properties of a linear polymer having just two chain ends per molecule will always be better than those of a branched polymer.

It is known that commercially produced polymers have a statistical molar mass distribution, the width of which is influenced by the way the catalyst was produced.

The expression "step increase in Mooney viscosity" and similar expressions such as "step Increase in Mooney value", "Mooney jumped" or "Mooney jump" refer to techniques to further enhance the Mooney viscosity of polymers after their polymerization.

Raising the molecular weight of elastomeric unsaturated diene polymers is important for various reasons. It first of all makes it possible to produce low molecular weight parent polymers, which has the Immense advantage in relation to the solution polymerization techniques typically employed of entailing lower viscosities in the "cement" (the solution of the polymer in the organic solvent medium used in the polymerization) and of permitting operation where there is a higher solids content in the "cement", since superior heat transfer is achieved. It is further possible to reduce the cold flow of such diene polymers, thus increasing their capability for oil-extension.

It is common general knowledge in the prior art that use of solution polymerization processes for direct production of high molecular weight polymers, in particular high molecular weight neodymium-catalysed polybutadiene, is particularly difficult and uneconomical because of high solution viscosities. There are difficulties with stirring. Further issues, include, some heterogeneity in the polymerization system and a dramatic decrease in heat transfer. Direct polymerization to high molecular weights would necessitate lower rates of polymer production as a result of lowering the solids content of the reaction space. Such an approach adds considerably to the costs of polymer manufacture.

It is known that "pre-forming" can change the catalytic effect of Nd catalysts. Such pre-formed Nd catalysts deliver polymers having relatively low cold flow, however, pre-forming usually reduces catalyst activity, so in some instances there is a considerable increase in neodymium consumption.

It is further known that polydienes having low cold flow are obtainable by treating the diene polymers with disulphur dichloride, sulphur dichloride, thionyl chloride, disulphur dibromide or thionyl bromide after the polymerization (DE-B 12 60 794). However, the process for producing elastomeric diene polymers which is described in DE-B 12 60 794 is disadvantageous in that this process is unsuitable for high molecular weight neodymium-catalysed polybutadiene when the Mooney jump is to be not less than 50% higher than the Mooney viscosity of the polymer after the polymerization. This is because the "jumped" polymer exhibits some gelling, which curtails reactor on-stream time as a result of wall deposits in the reactor. Reactor cleaning and maintenance is time consuming and expensive. There is further a risk that the polymer itself contains gel fractions and so can no longer be used for tyre applications.

The problem addressed by the present invention is therefore that of providing high molecular weight neodymium-catalysed polybutadienes (NdBR) capable of delivering vulcanizates having good dynamic final properties for polymers of high molar mass and Mooney viscosity, low rolling resistance, good crack resistance and low abrasion values coupled with good processing properties, for instance a shortened mixing time, versus unmodified NdBRs of the same Mooney viscosity, and a simplified extrudability at an increased strand speed.

The invention provides neodymium-catalysed polybutadienes (NdBR) comprising >95 wt % of cis-1,4 units and <1 wt % of 1,2-vinyl content, based on the neodymium-catalysed polybutadiene, which evince a molar mass breakdown of not less than 25%.

Preferably, the molar mass breakdown is effected by mixing a masticating agent with the NdBR, measuring the Mooney viscosity (ML 1+4 at 100° C.) of the NdBR before and after the mixing with the masticating agent and determining by calculation the percent change between the Mooney viscosities.

Preferably, the NdBR of the invention evinces a molar mass breakdown of not less than 33%, more preferably not less than 50%.

Molar mass breakdown within the meaning of this Invention is determined as follows: Mooney viscosities (ML 1+4 at 100° C.) are measured for the NdBR before and after mixing with the masticating agent and computed as follows:

$$\text{molar mass breakdown \%} = (K-L)/K*100$$

where
K=Mooney viscosity (ML 1+4 at 100° C.) of NdBR before mixing with masticating agent and, in the case where the polymer is Mooney jump modified, then such Mooney viscosity (ML 1+4 at 100° C.) being subsequent to the modification, and
L=Mooney viscosity (ML 1+4 at 100° C.) of NdBR after mixing with masticating agent.

It is known from the prior art that molar mass breakdown is of particular importance in the case of natural rubbers. Since natural rubber is difficult to process because of its high molar mass and gel content, processing is usually preceded by an operation known as mastication to intentionally bring about polymer chain cleavage. This breakdown of polymer chains may be effected either mechanically or thermal-oxidatively. The mechanical breakdown of natural rubbers is brought about on roll mills at high friction. The thermal-oxidative breakdown utilizes a series of substances (masticating agents, peptizers) to catalyse the oxidative process of breakdown. 2,2'-Dibenzamidodiphenyl disulphide (DBD) is an efficacious breakdown accelerant, while organic complexes of metal activate the process.

With regard to synthetic rubbers, in particular high molecular weight NdBR which has been Mooney jumped, i.e. modified such that its Mooney viscosity (ML 1+4 at 100° C.) is further increased after polymerization, molar mass breakdown is unknown in this context.

Surprisingly, a masticating agent was found to bring about molar mass breakdown in the case of the NdBR rubber of the present invention. The NdBR can thus be intentionally characterized. It is accordingly now possible to predict the processing behaviour of NdBR irrespective of its Mooney viscosity.

The masticating agent comprises a mixture containing iron phthalocyanine and 2,2'-dibenzamidodiphenyl disulphide, waxes and fillers. The masticating agent is mixed with the solid NdBR material. Any customary mixing assembly can be used for this, for example rolls, kneaders, mixers or extruders. On a roll is where mixing is typically carried out.

Any roll may be selected. The ideal choice for analytical proof of concept is a laboratory roll, which is preferably capable of handling polymers from 100 g to 2 kg. Roll diameter is preferably between 5 and 30 cm. Roll nip is chosen such that the milled sheet produced will be homogeneous. Roll nip is preferably between 0.3 and 2 mm, more preferably between 0.4 and 1 mm. Roll speed is chosen such that the operator can work efficiently and the milled sheet can be cut and folded over by hand to improve homogenization. The roll may be operated with or without friction. The amount of masticating mixture used may be between 0.1 and 2 wt % based on the polymer used. Larger amounts of masticating agent may also be added, but this will not result in any further increase in efficacy, while an excess of masticating mixture may further reduce the Mooney viscosity after the treatment.

The roll may be heated by an external temperature-regulating system to different temperatures. Temperatures between 70° C. and 160° C. are preferable and between 80° C. and 120° C. are particularly preferable. The ideal roll temperature is easily determined by preliminary tests. It depends on the heat transfer from the roll to the polymer, which in turn depends on the ratio of the roll surface area to the amount of polymer used, and on the activator used.

Roll temperature is preferably between 90° C. and 120° C. when iron phthalocyanine, as an activator, is used. Without activator in the masticating mixture, higher temperatures are preferably needed, and they are typically between 100° C. and 140° C.

Treatment duration depends on the temperature of the polymer on the roll and on the activator used in the masticating mixture. Treatment time is typically between 1 min and 30 min and may be determined by preliminary tests. An optimum combination of roll temperature and polymer quantity and amount of masticating mixture can ideally reduce the treatment time to the range from 1 to 10 min.

The invention further provides a process for producing the neodymium-catalysed polybutadienes (NdBR) of the present invention, wherein
1) butadiene monomer is polymerized in the presence of at least one inert organic solvent and in the presence of at least one catalyst based on neodymium compounds at temperatures of 60° C. to 140° C.,
2) the polymerization is subsequently stopped by admixture of reactive compounds,
3) sulphur chlorides are directly admixed with the polymer while not allowing the polymer to be cooled down, thereby forming a Mooney jumped polymer,
4) to the Mooney jumped polymer, admixing a masticating agent whereby molar mass breakdown is increased.

It should be understood that the admixture of sulphur chlorides to the polymer is also viewed as "modifying" the polymer.

The temperature in step 3) is preferably in the range from 66° C. to 140° C., more preferably at 75° C.-100° C. The modifying treatment takes less than 15 minutes, preferably 10 minutes.

Step 3) is preferably carried out with a static mixer or dynamic mixer.

When the temperature and duration conditions for admixing sulphur chlorides were complied with, this process surprisingly produced the high molecular weight neodymium-catalysed polybutadiene (NdBR) of the present Invention, which evinces a molar mass breakdown with a masticating agent by not less than 25%, based on the Mooney viscosity (ML 1+4 at 100° C.), while the molar mass breakdown is effected by mixing a masticating agent with the NdBR, measuring the Mooney viscosity (ML 1+4 at 100° C.) of the NdBR before and after the mixing with the masticating agent and determining the molar mass breakdown arithmetically.

It was also determined that the conversion of the sulphur chlorides is preferably not less than >90%, more preferably not less than >95% and even more preferably >97%. The pH of the polymer solution according to the present invention is Ideally in the range from 6 to 7 in that the conversion would then be >97%. The higher the sulphur chloride conversion, the gentler the process is on the plant equipment. This is because the subsequent stripping process may liberate HCl, which may lead to corrosion of plant equipment. The process of the present invention thus reduces and/or entirely prevents plant corrosion due to evolved HCl.

To determine its pH, the polymer solution from the polymerization is stirred with water, the amount of water used being equal to the amount of polymer solution. The water used has a pH of 7. For a quick test, the pH of the water is again measured after a few minutes, typically after 5 to 10 min. For a quantitative determination of the conversion of disulphur dichloride, the water is titrated against NaOH. The end point may be determined not only visually against an Indicator but also with a pH electrode.

It was determined that, surprisingly, the gel content of the polybutadiene produced according to the process of the present invention is preferably less than 1 wt %, more preferably less than 0.3 wt % and even more preferably less than 0.2 wt %. The method of determining the gel content is described hereinbelow.

The terminology used has the following meanings:

Initial Mooney viscosity: Mooney viscosity (ML 1+4 100° C.) after polymerization of the polymer, i.e. after step 2).

Final Mooney viscosity: Mooney viscosity (ML 1+4 100° C.) after modification/Mooney jump or jump reaction of the polymer (jumped polymer), i.e. after step 3).

Jumped polymer high molecular weight polybutadiene after modification, after the Mooney jump or after the jump reaction.

It is preferable to use Ziegler-Natta catalysts based on compounds of the rare earth metals, such as cerium, lanthanum, praseodymium, gadolinium or neodymium compounds, that are soluble in hydrocarbons. It is particularly preferable for the Ziegler-Natta catalysts used to be the corresponding salts of the rare earth metals, such as neodymium carboxylates, in particular neodymium neodecanoate, neodymium octanoate, neodymium naphthenate, neodymium 2,2-diethylhexanoate or neodymium 2,2-diethyheptanoate, such as neodymium phosphates, in particular neodymium tris(2-ethylhexyl phosphate)s, as described in WO-200238636 for example, and also the corresponding salts of lanthanum or of praseodymium. Useful Ziegler-Natta catalysts further comprise catalyst systems based on metallocenes, as described in EP-A 1025136 and EP-A 1078939 for example.

The process of the present invention is preferably carried out using the following steps:
a) polymerizing butadiene monomer in the presence of at least one inert organic solvent and in the presence of at least one catalyst based on neodymium compounds at temperatures of 60° C. to 140° C.,
  in a preferred embodiment, there is the catalyst preparation with or without pre-forming by using catalyst systems based on neodymium comprising
    component A: an alkoxide, a phosphate or a carboxylate of neodymium, preferably neodymium versatate,
    component B: an alkylaluminium compound, preferably diisobutylaluminium hydride (DIBAH),
    component C: a diene, preferably butadiene, and
    component D: at least one halogen compound, preferably ethylaluminium sesquichloride (EASC),
b) stopping the polymerization with reactive compounds, thereby forming a first polymer,
c) admixing sulphur chlorides with the first polymer while not allowing the first polymer to be cooled down, thereby forming a Mooney jumped polymer, and
d) to the Mooney jumped polymer admixing a masticating agent.

In another embodiment of the invention, the process may also comprise the further steps of:
c1) after step c) prior to step d) measuring the Mooney viscosity of the Mooney jumped polymer,
e) after step d) again measuring the Mooney viscosity of the polymer, and
f) calculating the molar mass breakdown % of the polymer.

It should also be appreciated, steps d), e) and f) may be repeated as necessary to achieve a desired molar mass breakdown %.

Useful dienes include butadiene, isoprene, pentadiene and 2,3-dimethylbutadiene, especially butadiene and isoprene. The recited dienes may be used not only individually but also mixed with one another, producing either homopolymers or copolymers of the recited dienes.

Once the catalyst system has been prepared, the polymerization is carried out in organic solvents. These solvents have to be Inert to the catalyst system used. Suitable solvents include, for example, aromatic, aliphatic and cycloaliphatic hydrocarbons such as benzene, toluene, pentane, n-hexane, isohexane, heptane, isomeric pentanes, cyclohexane, methylcyclopentane and cyclohexane. These solvents may be used individually or in combination. Cyclohexane and n-hexane are preferable. Blending with polar solvents is likewise possible.

The inert organic solvents are used in amounts of 200 to 900 parts by weight, based on 100 parts by weight of monomers. Amounts of 300 to 500 parts by weight are preferable.

The polymerization may be carried out not only continuously but also batchwise.

The polymerization is carried out at a temperature in the range from 60° to 140° C.

The polymerization may be carried out in a conventional manner in one or more stages, in batch operation or in continuous operation. Preference is given to a continuous operation in a reactor cascade consisting of a plurality of reactors, preferably at least 2, in particular from 2 to 6.

On attainment of the desired conversion the catalyst is deactivated in a conventional manner by addition of reactive compounds, such as protic compounds, i.e. the polymerization is stopped. The amount of protic compounds is preferably from 0 to 1 phr based on the monomer used.

Reactive compounds preferably comprise fatty acids, in which case saturated, monounsaturated or polyunsaturated vegetable or animal fatty acids, such as lauric acid, myristic acid, palmitic acid, oleic acid or versatic acid, can be used.

Preference is given to using stearic acid or lauric acid for deactivating the polymerization.

In another embodiment carboxylic acid may preferably not be necessary.

It is further possible on attainment of the desired conversion to react the catalyst with one or more reactive polar organic compounds which, following the reaction with the catalyst, may form a functional end group attached to the polymer chain.

It is similarly possible but not mandatory to perform a depressurization step after the polymerization in order that all low boilers be removed from the polymer.

The sulphur chlorides preferably comprise disulphur dichloride, sulphur dichloride and/or thionyl chloride or any mixture thereof.

It is similarly possible to use other sulphur halides, in which case chlorine or bromine is used as halogen, chlorine being used with preference. Dihalides of sulphur are customary, while the sulphur content per molecule may be in the range from 1 to 8 sulphur atoms, and preferably there are two sulphur atoms per halide. It is particularly preferable to effect the modification with disulphur dichloride.

The amount of sulphur chlorides, preferably disulphur dichloride, admixed per 100 parts by weight of diene rubber is generally in the range from 0.05 to 0.7 part by weight and preferably in the range from 0.1 to 0.4 part by weight.

Modifying is typically effected at temperatures of 66° C. to 140° C., preferably at 75° C. to 100° C., while modification takes less than 15 minutes, preferably 10 minutes.

Customary stabilizer may be added in customary amounts to the polymer solution prior to work-up. Useful stabilizers include, for example, sterically hindered phenols, e.g. 2,6-di-tert-butyl-4,5-methylphenol, 4,6-bis(octylthiomethyl)-o-cresol or octadecyl 3-(3,5-di-tert-butyl-4-hydroxyphenyl) propionate or aromatic amines, such as N-(1,3-dimethylbutyl)-N'-phenyl-para-phenylenediamine or phosphites, e.g. tris(nonylphenyl) phosphite. Other commercially available stabilizers may also be used.

The polymers are isolated by evaporating the polymer solution, by precipitating with a nonsolvent such as, for example, methanol, ethanol, acetone, or preferably by steam distilling the solvent.

After the stripping with steam, water is removed using suitable sieve or screw assemblies such as expeller or expander screws or fluidized-bed dryers.

Drying is carried out in a conventional manner, for example in a drying cabinet or in a screw dryer.

The high molecular weight neodymium-catalysed polybutadiene (NdBR) thus obtained comprises >90 wt % of cis-1,4 units and <1 wt % of 1,2-vinyl butadiene content, based on the neodymium-catalysed polybutadiene, evinces a molar mass breakdown of not less than 25%, based on the Mooney viscosity (ML 1+4 at 100° C.), while the molar mass breakdown is effected by mixing a masticating agent with the NdBR, measuring the Mooney viscosity (ML 1+4 at 100° C.) of the NdBR before and after the mixing with a masticating agent.

The high molecular weight polybutadiene (NdBR) of the present invention preferably evinces significantly reduced gelling, if any. The gel content is preferably less than 1 wt %.

The NdBR of the present invention preferably has the following properties:

molar mass (Mw) of NdBR between 1 to 10 000 kg/mol
polydispersity as Mw/Mn at from 1 to 5, preferably at from 1.2 to 3.0
Mooney viscosity between 30 MU and 150 MU
sulphur content at from 0.01 to 1 wt %, preferably from 0.02 to 0.5 wt %, based on 100 wt % of NdBR,
chlorine content at 0.01 to 1 wt %, preferably from 0.02 to 0.5 wt %, based on 100 wt % of NdBR,
fraction of 1,4-cis-butadiene units in polymer at >90%, preferably >95%,
fraction of 1,2-vinyl-butadiene units in polymer at <1%, preferably <0.5%.

The neodymium-catalysed polybutadiene of the present invention does not require any additions of extender oils, as of aromatic extender oils for example, to adjust the Mooney viscosity of the rubbers.

The polybutadienes of the present invention may be used alone, cut with aromatic or aliphatic oils or mixed with other rubbers. Additional rubbers suitable for producing rubber vulcanizates include not only natural rubber but also synthetic rubbers. They include BR—conventional polybutadiene
ABR—butadiene/C1-C4-alkyl acrylate copolymers
CR—polychloroprene
IR—polyisoprene
SBR—styrene-butadiene copolymers having styrene contents of 1 to 60, preferably 20 to 50 wt %
IIR—isobutylene-isoprene copolymers
NBR—butadiene-acrylonitrile copolymers having acrylonitrile contents of 5 to 60, preferably 10 to 40 wt %
HNBR—partially or fully hydrogenated NBR rubber
EPDM—ethylene-propylene-diene monomer copolymers
and also mixtures thereof. Materials of interest for the production of motor vehicle tyres with the aid of surface-modified fillers are, in particular, natural rubber, emulsion SBR and also solution SBR rubbers with a glass transition temperature above −50° C., optionally modified with silyl ethers or with other functional groups, as described in EP-A-0 447 066, polybutadiene rubber having high 1,4-cis content (>90 wt %) produced with Ni-, Co-, Ti- or Nd-based catalysts, and also polybutadiene rubber having a vinyl content of 0 to 75 wt %° and also mixtures thereof.

The rubber mixtures represent a further part of the subject-matter of the invention and generally contain from 5 to 300 parts by weight of an active or inert filer, e.g.

finely divided silicas as obtained for example by precipitation of solutions of silicates or flame hydrolysis of silicon halides with specific surface areas of 5 to 1000, preferably 20 to 400 m$^2$/g (BET surface area) and with primary particle sizes of 10 to 400 nm. The silicas may optionally also be present as mixed oxides with other metal oxides, such as the oxides of Al, of Mg, of Ca, of Ba, of Zn, of Zr or of TI, synthetic silicates, such as aluminium silicate, alkaline earth metal silicate such as magnesium silicate or calcium silicate, with BET surface areas of 20 to 400 m$^2$/g and primary particle diameters of 10 to 400 nm, natural silicates, such as kaolin and other naturally occurring silica, glass fibres and glass fibre products (mats, strands) or glass microbeads, metal oxides, such as zinc oxide, calcium oxide, magnesium oxide, aluminium oxide, metal carbonates, such as magnesium carbonate, calcium carbonate, zinc carbonate, metal hydroxides, e.g. aluminium hydroxide, magnesium hydroxide, metal salts, e.g. zinc or magnesium salts of [alpha],[beta]-unsaturated fatty acids, e.g. acrylic or methacrylic acid, having from 3 to 8 carbon atoms, such as zinc acrylate, zinc diacrylate, zinc methacrylate, zinc dimethacrylate and mixtures thereof;

carbon blacks. The carbon blacks to be used here are produced by the lamp-black process, the furnace-black process or the gas-black process and have BET surface areas of 20 to 200 m$^2$/g, e.g. SAF, ISAF, HAF, FEF or GPF blacks.

rubber gels, in particular those based on polybutadiene, butadiene-styrene copolymers, butadiene-acrylonitrile copolymers and polychloroprene.

Zinc diacrylates, finely divided silicas and carbon blacks are particularly preferable.

The recited fillers can be used alone or mixed. In one particularly preferable embodiment, the rubber mixtures contain by way of fillers a mixture of light-coloured fillers, such as finely divided silicas, and carbon blacks, wherein the mixing ratio of light-coloured fillers to carbon blacks is in the range from 0.05 to 20, preferably in the range from 0.1 to 10.

The form in which the fillers are added to the solution of the polybutadiene(s) of the present invention is preferably that of solids or of a slurry in water or a solvent. The rubber solution may be prepared beforehand, but preferably the as-polymerized solution is used directly. The solvent is subsequently removed thermally or preferably with the aid of steam. The conditions for this stripping operation are easily determined by preliminary tests.

The fillers are further preferably admixed to the solid polybutadiene of the invention or to a mixture of rubbers and Incorporated in a known manner, for example by using a kneader.

The rubber mixtures of the present invention may optionally further comprise crosslinkers. Crosslinkers used may be sulphur or peroxides, in which case sulphur is particularly preferred. The rubber mixtures of the present invention may contain further rubber auxiliaries, such as reaction accelerators, antioxidants, heat stabilizers, light stabilizers, antiozonants, processing aids, plasticizers, tackifiers, blowing agents, dyes, pigments, waxes, extenders, organic acids, retarders, metal oxides and also activators such as triethanolamine, polyethylene glycol, hexanetriol, etc., that are known to the rubber industry.

In the preferred rubber mixtures comprising high-activity precipitated silicas, the use of additional filler activators is particularly advantageous. Preferred filler activators include sulphur-containing silyl ethers, in particular bis(trialkoxysilylalkyl) polysulphides, as described in DE-A-2 141 159 and DE-A-2 255 577, oligomeric and/or polymeric sulphur-containing silyl ethers of DE-A-4 435 311 and EP-A-0 670 347, mercaptoalkyitrialkoxysilanes, in particular mercaptopropytriethoxysilane and thiocyanatoalkyl silyl ethers, as described in DE-A-195 44 469 for example.

The rubber auxiliaries are used in customary amounts, which depend inter alia on the intended use. Examples of customary amounts are amounts from 0.1 to 50 wt %, based on rubber.

The further blending of the rubbers with the other rubber auxiliaries, crosslinkers and accelerators mentioned may be carried out in a conventional manner with the aid of suitable mixing assemblies, such as rolls, internal mixers and mixing extruders.

The rubber mixtures of the present invention may be vulcanized at customary temperatures of 100 to 200° C., preferably 130 to 180° C. (optionally under a pressure of 10 to 200 bar).

The rubber mixtures of the present invention are very useful for producing shaped articles of any kind.

Nonlimiting examples of these shaped articles are O-rings, profiles, gaskets, membranes, tyres, tyre treads, damping elements and hoses.

Various tyre components and tyre treads are particularly preferred.

The rubber mixtures of the present Invention are further useful for impact modification of thermoplastics, in particular for polystyrene and styrene-acrylonitrile copolymers.

The use of the rubber mixtures for golf balls, in particular golf-ball cores, is particularly apt.

The purview of the invention encompasses all the moiety definitions, indices, parameters and explications cited hereinabove and hereinbelow in general terms or in preferred ranges in combination with one another, including that is in any desired combination of the respective ranges and preferred ranges.

The examples which follow are offered by way of further elucidation of the invention.

I. Production of High Molecular Weight Neodymium-Catalysed Polybutadienes (NdBR)

COMPARATIVE EXAMPLE 1:
CONVENTIONAL NDBR WITH MOONEY JUMP, ADMIXTURE OF $S_2CL_2$

1a) Polymerization:

A dry, nitrogen-inertized 20 L steel autoclave was charged with 8500 g of hexane (dried over molecular sieve), 1300 g of 1,3-butadiene, 21 mmol of a 20% solution of diisobutylaluminum hydride in hexane, 1.44 mmol of a 10% solution of ethylaluminium sesquichloride in hexane, and also 1.44 mmol of a 40% solution of neodymium versatate in hexane. The autoclave contents were heated to 73° C. with stirring and polymerized for 60 min with stirring. The temperature in the reactor rose to 90° C. Butadiene conversion after the polymerization was 98.7%.

The polymerization was stopped by admixture of 6.5 g of stearic acid (0.5 phr). The solution was kept at 90° C. for a further 15 min.

Initial Mooney viscosity (ML 1+4 at 100° C.): 39.5 MU, microstructure: 97.4 wt % of 1,4-cis, 1.9 wt % of 1,4-trans, 0.6 wt % of 1,2-vinyl 1b) Modification:

720 g of the polymer solution (13% solids) were transferred into a 2 L glass reactor. The solution was cooled to 40° C. prior to modification. For modification, 0.37 g of disulphur dichloride (0.4 phr, 2.96 mmol phm) was admixed. The solution was stirred at 45° C. for 15 min. A 100 g sample was taken of the solution for pH determination.

The NdBR was precipitated from the remaining solution by passing this remainder into 5 kg of ethanol, stabilized with Irganox 1520 (0.2 phr) and vacuum dried at 70° C.

Final Mooney viscosity (ML 1+4 at 100° C.): 55 MU; gel content <0.3 wt %, microstructure: 97.4 wt % of 1,4-cis, 1.9 wt % of 1,4-trans, 0.6 wt % of 1,2-vinyl, pH: 4.6.

Measurement of Sulphur Chloride Conversion U by Titration:

Of the 100 g of water used, 10 g of water were titrated against 0.1 molar NaOH solution, using phenolphthalein indicator:
consumption of NaOH=0.23 ml, this corresponds to 0.023 mmol for concentration of 0.1 mol/L
computed according to the equation $$U[S_2Cl_2] \text{ in } \% = (1-(n[NaOH])/(n[S_2Cl_2]*2*c[BR]*F))*100$$

$$U[S_2Cl_2] \text{ in } \% = (1-(0.023 \text{ mmol})/(2.96 \text{ mmol}*2*0.13*0.1))*100$$

$$=(1-0.023 \text{ mmol}/0.077 \text{ mmol})*100=70\%$$

1c) Molar Mass Breakdown

Masticating agent: 4 g of DBD were mixed with 6 g of talcum and 0.08 g of iron phthalocyanine in a mortar.
250 g of the polymer from 1b) were admixed with 1.56 g of masticating agent on the laboratory roll at 120° C. Roll nip was 0.5 mm, roll diameter was 10 cm. Rolling time was 15 min.
Mooney viscosity (ML 1+4 at 100° C.): 40 MU
Gel content <0.3 wt %
Molar mass breakdown: 27%

COMPARATIVE EXAMPLE 2: NDBR WITHOUT MOONEY JUMP

Molar Mass Breakdown:

250 g of a neodymium-catalysed polybutadiene of the Buna CB22 type (initial Mooney viscosity (ML 1+4 at 100° C.)=63.3 MU) were admixed with 1.56 g of masticating agent on the laboratory roll at 120° C. Roll nip was 0.5 mm, roll diameter was 10 cm. Rolling time was 15 min.
Mooney viscosity (ML 1+4 at 100° C.): 62 MU, Mooney Stress Relaxation (MSR at 100'C): 0.69, gel content <0.3 wt %
Molar mass breakdown: 2%

INVENTIVE EXAMPLE 3: NDBR WITH MOLAR MASS BREAKDOWN OF 33%

3a) Polymerization:

A dry, nitrogen-inertized 20 L steel autoclave was charged with 8500 g of hexane (dried over molecular sieve), 1300 g of 1,3-butadiene, 21 mmol of a 20% solution of diisobutylaluminium hydride in hexane, 1.44 mmol of a 10% solution of ethylaluminium sesquichloride in hexane, and also 1.44 mmol of a 40% solution of neodymium versatate in hexane. The autoclave contents were heated to 73° C. with stirring and polymerized for 60 min with stirring. The temperature in the reactor rose to 90° C. The polymerization was stopped by admixture of 6.5 g of stearic acid (0.5 phr).
A conversion test sample was taken. Butadiene conversion after the polymerization was found to be 98.7%.
Initial Mooney viscosity (ML 1+4 at 100° C.): 40 MU;
microstructure: 97.5 wt % of 1,4-cis, 2.0 wt % of 1,4-trans, 0.5 wt % of 1,2-vinyl 3b) Modification;

The polymer solution was admixed with 3.33 g of disulphur dichloride (0.3 phr) at 90° C. for modification. The solution was stirred at 90° C. for a further 14 min. A 100 g sample was taken of the solution for pH determination.
The NdBR was precipitated from the remaining solution by passing this remainder into 5 kg of ethanol, stabilized with Irganox 1520 (0.2 phr) and vacuum dried at 70° C. Final weight after drying: 1263 g.
Final Mooney viscosity (ML 1+4 at 100° C.): 61.0 MU; gel content <0.3 wt %
microstructure: 97.5 wt % of 1,4-cis, 2.0 wt % of 1,4-trans, 0.5 wt % of 1,2-vinyl
Molar mass: Mn=202 kg/mol, Mw=418 kg/mol, Mz=1050 kg/mol; polydispersity (Mw/Mn)=2.07
Solution viscosity. 277 mPas.
pH: 6.5

Measurement of Sulphur Chloride Conversion U by Titration:

Of the 100 g of water used, 10 g of water were titrated against 0.01 molar NaOH solution, using phenolphthalein Indicator:
consumption of NaOH=0.08 ml, this corresponds to 0.0008 mmol for concentration of 0.01 mol/L
computed according to the equation $$U[S_2Cl_2] \text{ in } \% = (1-(n[NaOH])/(n[S_2Cl_2]*2*c[BR]*F))*100$$

$$U[S_2Cl_2] \text{ in } \% = (1-(0.023 \text{ mmol})/(2.22 \text{ mmol}*2*0.13*0.1))*100$$

$$=(1-0.0008 \text{ mmol}/0.058 \text{ mmol})*100=99\%$$

3c) Molar Mass Breakdown

Masticating agent: 4 g of DBD were mixed with 6 g of talcum and 0.08 g of iron phthalocyanine in a mortar.
250 g of the NdBR from 3b) were admixed with 1.56 g of masticating agent on the laboratory roll at 120° C. Roll nip was 0.5 mm, roll diameter was 10 cm. Rolling time was 15 min.
Mooney viscosity (ML 1+4 at 100° C.): 40.7 MU; gel content <0.3 wt %
Molar mass: Mn=189 kg/mol, Mw=362 kg/mol; polydispersity (Mw/Mn)=1.92
Molar mass breakdown: 33%

INVENTIVE EXAMPLE 4: NDBR WITH MOLAR MASS BREAKDOWN OF 35%

4a) Polymerization:

The polymerization was carried out similarly to Example 1.
The final temperature in the reactor was 95° C., butadiene conversion was 99%.
Initial Mooney viscosity (ML 1+4 at 100° C.): 40 MU;
microstructure: 97.5 wt % of 1,4-cis, 2.0 wt % of 1,4-trans, 0.5 wt % of 1,2-vinyl 4b) Modification:

The polymer solution was admixed with 3.33 g of disulphur dichloride (0.3 phr) at 95° C. for modification. The solution was stirred at 95° C. for a further 10 min. A 100 g sample was taken of the solution for pH determination.
The NdBR was precipitated from the remaining solution by passing this remainder into 5 kg of ethanol, stabilized with Irganox 1520 (0.2 phr) and vacuum dried at 70° C.
Final Mooney viscosity (ML 1+4 at 100° C.): 62.7 MU; gel content <0.3 wt %
microstructure: 97.4 wt % of 1,4-cis, 2.0 wt % of 1,4-trans, 0.6 wt % of 1,2-vinyl
Molar mass: Mn=212 kg/mol, Mw=462 kg/mol, Mz=1150 kg/mol; polydispersity (Mw/Mn)=2.17
Solution viscosity: 288 mPas
pH: 6.4
Conversion of $S_2Cl_2$: 99%

4c) Molar Mass Breakdown:

In a Brabender type internal mixer turning at 20 rpm, 230 g of NdBR were mixed and heated to 130° C. in the course of 5 min. 1.44 g of masticating agent were added thereto and mixed in under the same conditions for 1 min. This procedure was carried out 4 times in total. The rubber was combined.

Mooney viscosity (ML 1+4 at 100° C.): 41.0 MU; gel content <0.3 wt %

Molar mass breakdown: 35%

Tests:

A: Determination of gel content of polybutadiene in styrene by gravimetric methods similar to the BAYELAS MO AQ 259—A LAB method:

25.0 g of polymer are weighed out on a laboratory balance to an accuracy of 0.1 g. The edges were previously cut off and discarded. The polymer is cut into small pieces. A 1 l wide-neck bottle is initially charged with 850 ml of filtered styrene and the polymer is dissolved on a shaker in the course of about 4 hours.

A wire gauze consisting of a woven wire cloth having a mesh size of 0.036 mm, Ø50 mm, is heated to red heat and placed in a desiccator bottle to cool down. After cooling, the wire gauze is moved from the desiccator bottle and weighed on an analytical balance to an accuracy of 0.1 mg. This is weight A. Three glass beakers are provided which each contain 100 ml of filtered styrene. The wire gauze with a diameter of 50 mm is placed in the "Gelman" metal filtration system (seal-filter-seal), and the funnel attachment is screwed into place.

The polymer solution is then poured through the filter. The first of the three styrene-containing glass beakers is used to rinse the wide-neck bottle, and this solution is likewise passed through the filter. The filter is subsequently rinsed with the other two styrene portions.

The filter is then carefully removed with pincers and placed on a clean paper tissue. Pressure is carefully applied with the pincers to the edge of the filter. An eyeglass is used to observe the evaporating styrene. The moist wire filter, still wetted with styrene, becomes visibly lighter in colour as the amount of styrene decreases. Once all the filter meshes are free from styrene, the filter is immediately weighed back on the balance. This Is weight B.

After the second weighing of the filter, the filter is dried in a drying cabinet at 100° C. (±5° C.) for 15 minutes in order to determine the dry gel content. All the while the filter is situated in an open desiccator bottle. After drying, the bottle plus filter is placed in the desiccator for about 10 minutes to cool down and then reweighed. This is weight C. Computations:

$$\text{wet gel} = \frac{(B-A) * 10^6}{25} \text{ [ppm]}$$

$$\text{dry gel} = \frac{(C-A) * 10^6}{25} \text{ [ppm]}$$

$$\text{swelling index} = \frac{\text{wet gel}}{\text{dry gel}} \text{ [dimensionless]}$$

B: Mooney viscosity and Mooney Stress Relaxation to ASTM D1646-00

C: Solution viscosity to ISO 3105:

A Brookfield DV-I rotary viscometer is used to measure a 5.43% polymer solution in toluene at room temperature.

D: GPC was performed by Currenta.

E: Microstructure determination

Currenta, ELA 101: A solution of the polymer in toluene is poured on a KBr window, the solvent is evaporated and the polymer film is measured by FTIR spectroscopy between 2 KBr windows.

ESBO: epoxidized soya bean oil from Cognis

Irganox 1520: 4,6-bis(octylthiomethyl)-o-cresol from BASF

F: Measurement of sulphur chloride conversion

To determine the pH, deionized water having a pH of 7 (at 25° C.) is used. For this, 100 g of the polymer solution from the polymerization are removed and stirred up with 100 g of water in a glass vessel equipped with a KPG stirrer. The temperature is 50° C. and is set via an external water bath. Stirring time is 10 min. The pH of the aqueous phase is measured.

G: Quantitative determination of conversion U of disulphur dichloride

To quantitatively determine the conversion of disulphur dichloride, 10 g of the water are titrated against NaOH. The molarity of the NaOH solution depends on the amount of acid to be titrated and is typically between 1 mol/l and 0.01 mol/l. The end point at pH 7 can be determined not only visually against an indicator, but also with a pH electrode. The consumption of NaOH can be used to determine the conversion U of disulphur dichloride.

$$U[S_2Cl_2] \text{ in } \% = (1-(n[NaOH])/(n[S_2Cl_2]*2*c[BR]*F))*100$$

$U[S_2Cl_2]$=conversion of $S_2Cl_2$ in %
n[NaOH]=consumption of mmol of NaOH in titration
c[BR]=g of polymer/(g of polymer solution)
$n[S_2Cl_2]$=mmol of $S_2Cl_2$ per 100 g of BR
F=amount of water used/amount of titrated water, where the amount of extracted polymer solution corresponds to the amount of water used for extraction.

II. Production of Rubber Mixtures and Vulcanizates

Rubber mixtures were produced to contain BUNA™ CB 24 as Nd-catalysed polybutadienes without modification (P1), the polymer of Example 3b) with Mooney jump, but without modification (P2) and the Inventive polymer 4c) from Example 2 after molar mass breakdown (P3). In the rubber mixtures P1*, P2* and P3* 50 phr of the particular abovementioned polybutadienes were admixed with 50 phr of natural rubber in each case.

The mixture constituents are listed in Table 1. The mixtures were first produced in a 1.5 L kneader without sulphur and accelerator. The mixture constituents sulphur and accelerator were then admixed on a roll at 40° C. Table 2 shows the recipes and the measured test results.

The substances used for the mixture studies were as follows:

TABLE 1

| Commercial name | Manufacturer |
|---|---|
| BUNA ™ CB 24 as Nd polybutadiene | Lanxess Deutschland GmbH |
| CORAX N 326 as carbon black | Evonic Degussa GmbH |
| VIVATEC 500 as oil | Hansen und Rosenthal KG |
| ZINKWEIβ ROTSIEGEL as zinc oxide | Grillo Zinkoxid GmbH |
| EDENOR C 18 98-100 as stearic acid | Caldic Deutschland GmbH |
| VULKANOX 4020/LG as stabilizer | Lanxess Deutschland GmbH |
| VULKANOX HS/LG as stabilizer | Lanxess Deutschland GmbH |
| VULKACIT ® CZ/EGC as accelerator | Lanxess Deutschland GmbH |
| RHENOGRAN IS 60-75 as sulphur | RheinChemie Rheinau GmbH |
| TSR/RSS 3 DEFO 700 | Defo 700 natural rubber |

TABLE 2

|  |  | P1 | P2 | P3 | P1* | P2* | P3* |
|---|---|---|---|---|---|---|---|
| BUNA CB 24 |  | 100 |  |  | 50 |  |  |
| polymer after Mooney jump from Example 3b), without modification |  |  | 100 |  |  | 50 |  |
| Inventive Example 4c) |  |  |  | 100 |  |  | 50 |
| TSR/RSS 3 DEFO 1000 |  |  |  |  | 50 | 50 | 50 |
| STATEX N 330 |  | 50 | 50 | 50 | 50 | 50 | 50 |
| VIVATEC 500 |  | 4 | 4 | 4 | 4 | 4 | 4 |
| EDENOR C 18 98-100 |  | 2 | 2 | 2 | 2 | 2 | 2 |
| VULKANOX 4020/LG |  | 2 | 2 | 2 | 2 | 2 | 2 |
| VULKANOX HS/LG |  | 3 | 3 | 3 | 3 | 3 | 3 |
| ZINKWEISS ROTSIEGEL |  | 3 | 3 | 3 | 3 | 3 | 3 |
| MAHLSCHWEFEL 90/95 CHANCEL |  | 2.36 | 2.36 | 2.36 | 2.36 | 2.36 | 2.36 |
| VULKACIT CZ/EGC |  | 1.4 | 1.4 | 1.4 | 1.4 | 1.4 | 1.4 |
| Monsanto - MDR: 160° C., 30 min |  |  |  |  |  |  |  |
| torque minimum | [dNm] | 2.55 | 2.63 | 2.52 | 1.94 | 2.01 | 1.89 |
| torque maximum | [dNm] | 26.7 | 24.9 | 24.2 | 22.1 | 21.9 | 21.4 |
| rise time TS1 | s | 153 | 133 | 124 | 137 | 134 | 121 |
| rise time TS2 | s | 176 | 154 | 139 | 154 | 152 | 136 |
| conversion time 10% | s | 181 | 156 | 140 | 153 | 151 | 135 |
| conversion time 50% | s | 224 | 198 | 175 | 189 | 188 | 169 |
| conversion time 95% | s | 384 | 355 | 319 | 326 | 329 | 299 |
| Mooney viscosity ML1 + 4/100 |  |  |  |  |  |  |  |
| ML 1 + 4 | ME | 68.0 | 70.0 | 72.5 | 53.4 | 55.0 | 54.7 |
| S2 RT tensile test bar |  |  |  |  |  |  |  |
| S10 | MPa | 0.7 | 0.6 | 0.6 | 0.6 | 0.6 | 0.6 |
| S100 | MPa | 2.8 | 2.7 | 2.7 | 2.9 | 3 | 3.2 |
| S300 | MPa | 12.5 | 13 | 13.7 | 13.8 | 14.6 | 15.7 |
| D Median | % | 368 | 346 | 354 | 407 | 438 | 440 |
| F Median | MPa | 16.9 | 15.9 | 17.3 | 20.5 | 23.6 | 24.3 |
| Hardness at 60° C. | Shore A | 64.0 | 64.0 | 63.5 | 61.5 | 62.0 | 62.0 |
| rebound resilience at 60° C. | % | 66.7 | 66.6 | 66.5 | 63.6 | 66.5 | 68.1 |
| MTS Amplitude Sweep @ 60° C., 1 Hz |  |  |  |  |  |  |  |
| G* (0.5%) | MPa | 2.37 | 2.4 | 2.06 | 2.25 | 2.16 | 2.1 |
| G* (15%) | MPa | 1.45 | 1.49 | 1.41 | 1.27 | 1.27 | 1.26 |
| G* (0.5%) − G* (15%) | MPa | 0.92 | 0.91 | 0.65 | 0.98 | 0.89 | 0.84 |
| tan d (max.) |  | 0.113 | 0.113 | 0.097 | 0.123 | 0.116 | 0.114 |
| dynamic damping DIN 53513; Ares strip, 10 Hz, 1 K/min |  |  |  |  |  |  |  |
| E' (0° C.) | MPa | 13.05 | 11.02 | 9.22 | 16.23 | 13.74 | 11.7 |
| tan d (0° C.) |  | 0.071 | 0.068 | 0.068 | 0.093 | 0.088 | 0.085 |
| E' (23° C.) | MPa | 11.58 | 10.06 | 8.44 | 13.85 | 11.84 | 10.14 |
| tan d (23° C.) |  | 0.061 | 0.056 | 0.057 | 0.077 | 0.069 | 0.064 |
| E' (60° C.) | MPa | 10.41 | 9.13 | 7.77 | 11.51 | 10.03 | 8.71 |
| tan d (60° C.) |  | 0.049 | 0.044 | 0.046 | 0.063 | 0.054 | 0.05 |
| Abrasion DIN 53516 | mm$^3$ | 13 | 13 | 12 | 51 | 48 | 45 |

Inventive vulcanizates P3 and P3* versus comparative examples P1 and P2 and also P1* and P2* exhibit a reduction in the vulcanization time needed in Monsanto MDR: an improvement in the indicators for low rolling resistance, such as high rebound resilience at 60° C., a low tangent delta maximum in the MTS test at 60° C. and a low tangent delta at 60° C. in the Eplexor test, also superior results in the stress-strain test, as evident from a higher quotient from S300/S10 and also in the case of the mixture with natural rubber P3* versus P1* and P2* very low values in the abrasion test.

Vulkanizate Tests

The following properties were determined on the vulcanizates in accordance with the stated standards:

DIN 53505: Shore A hardness at 60° C.

DIN 53512: rebound resilience at 60° C.

DIN 53504: stress values at 10%, 100% and 300% elongation ($\sigma_{10}$, $\sigma_{100}$ and $\sigma_{300}$), tensile strength and elongation at break DIN 53516: abrasion DIN53513: dynamic damping via Eplexor equipment—Eplexor equipment (Eplexor 500 N) from Gabo-Testanlagen GmbH, Ahlden, Germany was used to determine dynamic properties (temperature dependency of storage modulus E' in the temperature range from −60° C. to 0° C. and also tan δ at 60° C.). The values were determined in accordance with DIN53513 at 10 Hz on Ares strips in the temperature range from −100° C. to +100° C. at a heating rate of 1 K/min.

The method was used to obtain the following variables, the terminology here being in accordance with ASTM 5992-96:

E' (60° C.): storage modulus at 60° C.

E' (23° C.): storage modulus at 23° C.

E' (0° C.): storage modulus at 0° C.

and also tan δ (60° C.): loss factor (E"/E') at 60° C.

tan δ (23° C.): loss factor (E"/E') at 23° C.

tan δ (0° C.): loss factor (E"/E') at 0° C.

E' provides an Indication of the grip of a winter tyre tread on ice and snow. As E' decreases, grip Improves.

tan δ (60° C.) is a measure of hysteresis loss from the tyre under operating conditions. As tan δ (60° C.) decreases, the rolling resistance of the tyre decreases.

DIN53513-1990: Elastic properties—An MTS elastomer test system (MTS Flex Test) from MTS was used to determine the elastic properties. The measurements were carried out in accordance with DIN53513-1990 on cylindrical samples (2 samples each 20×6 mm) with a total 2 mm compression at a temperature of 60° C. and a measurement frequency of 1 Hz in the range of amplitude sweep from 0.1 to 40%.

The method was used to obtain the following variables, the terminology here being in accordance with ASTM 5992-96:

G* (0.5%): dynamic modulus at 0.5% amplitude sweep
G* (15%): dynamic modulus at 15% amplitude sweep
G* (0.5%)-(15%): difference of dynamic modulus at 0.5% relative to 15% amplitude sweep
and also
tan δ (max): maximum loss factor (G''/G') of entire measuring range at 60° C.

G* (0.5%)-(15%) is an indication of the Payne effect of the mixture in that a low value indicates good filler distribution and hence a low rolling resistance.

tan δ (max) is a measure of the hysteresis loss from the tyre under operating conditions. As tan δ (max) decreases, the rolling resistance of the tyre decreases.

What is claimed is:

1. A process for the production of neodymium-catalysed polybutadiene (NdBR), the process comprising:
    a) polymerizing butadiene monomer in a first mixture comprising at least one inert organic solvent and at least one catalyst based on neodymium compounds at a reaction temperatures of 60° C. to 140° C.,
    b) admixing reactive compounds into the first mixture to stop the polymerization, thereby forming a first polymer, and
    c) admixing sulphur chlorides and the first polymer while maintaining the temperature of the first polymer at essentially the reaction temperature, thereby forming a Mooney jumped polymer,
wherein the neodymium-catalysed polybutadiene evinces a molar mass breakdown % of not less than 33%.

2. The process according to claim 1, wherein the neodymium-catalysed polybutadiene evinces a molar mass breakdown % of not less than 50%.

3. The process according to claim 1, further comprising the steps of:
    c1) after step c), measuring the Mooney viscosity of the Mooney jumped polymer,
    d) admixing the Mooney jumped polymer and a masticating agent,
    e) after step d), again measuring the Mooney viscosity of the Mooney jumped polymer,
    f) calculating the molar mass breakdown % of the polymer, and
    optionally, repeating steps d), e) and f).

4. The process according to claim 1, wherein the temperature in step c) is 66° C. to 140° C.

5. The process according to claim 1, wherein step c) is performed for less than 15 minutes.

6. The process according to claim 1, wherein sulphur chloride conversion is >90%.

7. The process according to claim 1, wherein the catalyst based on neodymium compounds comprises a catalyst system of
    component A: an alkoxide, a phosphate or a carboxylate of neodymium,
    component B: an alkylaluminium compound,
    component C: a diene, and
    component D: at least one halogen compound.

8. The process according to claim 1, wherein the reactive compounds comprise stearic acid or lauric acid.

9. The process according to claim 1, wherein the admixing of the sulphur chlorides is effected at a temperature of 75° C. to 100° C.

10. The process according to claim 1, further comprising adding a stabilizer after the admixture of the sulphur chlorides.

11. The process according to claim 1, wherein the amount of sulphur chlorides admixed is from 0.05 to 0.7 part by weight, per 100 parts by weight of diene rubber.

12. The process according to claim 1, wherein the sulphur chlorides comprise disulphur dichloride, sulphur dichloride, thionyl chloride or any mixture thereof.

13. Rubber mixtures containing neodymium-catalysed polybutadiene (NdBR) formed according to the process of claim 1, wherein:
    the neodymium-catalysed polybutadiene comprises >90 wt % of cis-1,4 units and <1 wt % of 1,2-vinyl butadiene content, based on the neodymium-catalysed polybutadiene, and
    the neodymium-catalysed polybutadiene evinces a molar mass breakdown % of not less than 33%, wherein the molar mass breakdown is effected by:
    mixing a masticating agent with the NdBR,
    measuring the Mooney viscosity (ML 1+4 at 100° C.) of the NdBR before and after the mixing with the masticating agent, and
    computing the molar mass breakdown according to the formula (I)

$$\text{molar mass breakdown } \% = (K-L)/K*100 \quad (I)$$

where
    K=Mooney viscosity (ML 1+4 at 100° C.) of NdBR before mixing with masticating agent, and
    L=Mooney viscosity (ML 1+4 at 100° C.) of NdBR after mixing with masticating agent.

14. Neodymium-catalysed polybutadienes (NdBR) comprising >95 wt % of cis-1,4 units and <1 wt % of 1,2-vinyl content, based on the neodymium-catalysed polybutadiene, wherein:
    the NdBR evinces a molar mass breakdown of not less than 33%, and
    the molar mass breakdown is effected by:
    mixing a masticating agent with the NdBR, wherein the masticating agent comprises a mixture containing iron phthalocyanine and 2,2'-dibenzamidodiphenyl disulphide, waxes and fillers,
    measuring the Mooney viscosity (ML 1+4 at 100° C.) of the NdBR before and after the mixing with the masticating agent, and
    computing the molar mass breakdown according to the formula (I)

$$\text{molar mass breakdown } \% = (K-L)/K*100 \quad (1)$$

where
    K=Mooney viscosity (ML 1+4 et 100° C.) of NdBR before mixing with masticating agent, and
    L=Mooney viscosity (ML 1+4 at 100° C.) of NdBR after mixing with masticating agent.

15. The neodymium-catalyzed polybutadienes (NdBR) according to claim 14, wherein the NdBR evinces a molar mass breakdown of not less than 50%.

16. The process according to claim 1, wherein:
    step c) is performed for less than 10 minutes; and
    sulphur chloride conversion is >97%.

17. The process according to Cam 1, wherein the catalyst based on neodymium compounds comprises a catalyst system of component A: neodymium versatate,
component B: diisobutylaluminium hydride (DIBAH),
component C: butadiene, and
component D: ethylaluminium sesquichloride (EASC).

18. The process according to claim 1, wherein the amount of sulphur chlorides admixed is from 0.1 to 0.4 part by weight, per 100 parts by weight of diene rubber.

* * * * *